(12) United States Patent  (10) Patent No.: US 9,210,413 B2
Grinberg et al.  (45) Date of Patent: Dec. 8, 2015

(54) SYSTEM WORN BY A MOVING USER FOR FULLY AUGMENTING REALITY BY ANCHORING VIRTUAL OBJECTS

(75) Inventors: Daniel Grinberg, Gan-Chaim (IL); Gabby Sarusi, Rishon LeZion (IL); Eli Luria, Or Yehuda (IL)

(73) Assignee: IMAGINE MOBILE AUGMENTED REALITY LTD, Rishon LeZion (IL)

( * ) Notice: Subject to any disclaimer, the term of this patent is extended or adjusted under 35 U.S.C. 154(b) by 175 days.

(21) Appl. No.: 13/471,489

(22) Filed: May 15, 2012

(65) Prior Publication Data

US 2013/0307842 A1  Nov. 21, 2013

(51) Int. Cl.
| | |
|---|---|
| G09G 5/00 | (2006.01) |
| H04N 13/04 | (2006.01) |
| G06F 3/14 | (2006.01) |
| G06F 1/16 | (2006.01) |
| G06F 3/01 | (2006.01) |
| G09G 3/00 | (2006.01) |
| G02B 27/01 | (2006.01) |

(52) U.S. Cl.
CPC .............. *H04N 13/044* (2013.01); *G06F 1/163* (2013.01); *G06F 3/011* (2013.01); *G06F 3/1431* (2013.01); *G02B 2027/014* (2013.01); *G09G 3/003* (2013.01); *G09G 2340/125* (2013.01); *G09G 2370/022* (2013.01); *G09G 2370/12* (2013.01); *G09G 2370/16* (2013.01)

(58) Field of Classification Search
None
See application file for complete search history.

(56) References Cited

U.S. PATENT DOCUMENTS

| | | | |
|---|---|---|---|
| 2010/0164990 A1* | 7/2010 | Van Doorn | 345/633 |
| 2012/0249741 A1* | 10/2012 | Maciocci et al. | 348/46 |
| 2013/0044128 A1* | 2/2013 | Liu et al. | 345/633 |
| 2013/0155106 A1* | 6/2013 | Rolleston et al. | 345/633 |

* cited by examiner

*Primary Examiner* — Xiao Wu
*Assistant Examiner* — Mohammad H Akhavannik

(57) ABSTRACT

A system to anchor virtual objects to real world objects, visually, functionally and behaviorally, to create an integrated, comprehensive, rational augmented reality environment, the environment comprising at least the relative location, perspective and viewing angle of the virtual objects in the real world, and the interaction between the virtual objects with the real world and with other virtual objects. The system includes an input device having a built-in interface, which receives data from an High-Definition Multimedia Interface (HDMI) adapter, or any other communication device, and returns images to a microprocessor, an HDMI compact audio/video adapter for transferring encrypted uncompressed digital audio/video data from an HDMI-compliant device and a head-mounted display worn by a user, housing at least one micro-camera and an inertial movement unit (IMU). The system also includes a microprocessor/software unit, which provides data input from the at least one micro-camera and the IMU and a power source.

19 Claims, 4 Drawing Sheets

SYSTEM WORN BY A MOVING USER FOR FULLY AUGMENTING REALITY BY ANCHORING VIRTUAL OBJECTS

FIELD OF THE INVENTION

The present invention generally relates to augmented reality systems, and more particularly to a system to visually anchor virtual objects to real world objects functionally and behaviorally, to create an integrated, comprehensive, rational augmented reality environment in a fixed position and where the user/observer can move around without loss of context, including relative position, 3D perspective and viewing angle of the virtual objects in the real world, and the interaction between the virtual objects with the real world and between multiple virtual objects. Interaction of virtual objects for multiple users is also enabled, wherein the system has been provided for each of the multiple users in communication with each other.

BACKGROUND OF THE INVENTION

Augmented reality (AR) is a live, direct or indirect, view of a physical, real-world environment whose elements are augmented by computer-generated sensory input such as sound, video, graphics or GPS data. AR is related to the more general mediated reality (MR) concept, in which a view of reality is modified, rather than augmented by a computer. As a result, the technology functions by enhancing the current perception of reality. By contrast, virtual reality replaces the real world with a completely simulated one.

Augmentation is conventionally in real-time and in semantic context with environmental elements, such as current and external sports scores on TV during a match. With the help of advanced AR technology, e.g. adding computer vision and object recognition, the information about the surrounding real world of the user becomes interactive and digitally manipulatable. Artificial information about the environment and its objects can be overlaid on the real world.

Research explores the application of computer-generated imagery in live-video streams in order to enhance the perception of the real world. AR technology includes head-mounted displays and virtual retinal displays for visualization and building of controlled environments, enabled by sensors and actuators.

See-through glasses are an existing technology, which comprise: an electro optic device; and a pair of transparent glasses, which project a given display screen seen with the user's eyesight, as if it were a real display screen in the real world with a focal length at infinity, so the display images can be seen, although it is positioned at a close proximity to the eyes. Since see-through glasses screen to each eye separately, the image displayed can be very realistic 3 dimensional holography. Since the color black is seen as transparent in the see-through glasses, because black does not return light, objects within a black screen are insulated and are seen normally as they exist.

Total Immersion is an augmented reality company whose D'Fusion technology uses the black frame feature to merge real time interactive 3D graphics into live video sources.

Thus, it would be advantageous to provide a wearable solution that also overcomes the limited applicability of augmented reality systems to preserve realism during movements of the user/observer, and thereby enable more realistic and resourceful integration of virtual and real elements in the user's environment.

SUMMARY OF THE INVENTION

Accordingly, it is a principal object of the present invention to enable more realistic and resourceful integration of virtual and real elements in the user/observer's environment.

It is another principal object of the present invention to visually anchor chosen virtual objects to the real world, functionally and behaviorally, in order to create an integrated, comprehensive, rational augmented reality environment, both in a fixed position and on the move.

It is one other principal object of the present invention to provide a system (hardware) worn by a moving user/observer and method (algorithm/software), to anchor computer generated images superimposed on the real-world view using see-through glasses, providing integration of the data input from the system, elaborated by the method and creating the solution output via pixel processing, as displayed for the user/observer through see-through glasses.

It is still another principal object of the present invention to provide IMU stabilization to a specific azimuth in the coordinate the space—moving the CGI within a floating black frame, using a compensation formula. (soft anchoring).

It is yet another principal object of the present invention to provide computer vision (CV) dynamic 3D integration of the computer generated image (CGI) to the real world using real world objects as markers (hard anchoring), to which the virtual objects are realistically related.

It is one further principal object of the present invention to implement computer vision and elaboration of the image based on perspective.

It is yet one other principal object of the present invention to enable software applications by building a dynamic data base of virtual objects in realistic interaction with the rest of the world.

A set of logic rules is provided dedicated to process computer generated images according to their defined nature of interaction including positioning, perspective, functionality and behavior.

A set of logic rules is provided dedicated to share a virtual world among individuals creating a sequence of actions and its respective image processing, and according to each individual and his relative view angle and perspective.

A software development kit (SDK) is provided including dedicated software to allow any developer to create applications of any kind integrating a virtual world with the real world.

The source image is the computer generated image (CGI), as opposed to the image displayed on the black frame. The video image received by the cameras installed on the see through device is the reference of the real world from which the software identifies real objects as markers, using computer vision applications and respective algorithms, in order to "hard anchor" (i.e., tight relative connection between the virtual object and the real object) the CGI to the real world. The source image (CGI) is to be distinguished from the reference image for anchoring using computer vision.

Soft anchoring is anchoring to a certain point, independent of any modifications and circumstances in the real world. By contrast, hard anchoring is anchoring to objects in the real world, pin-pointed by the markers, including modification and transformation, perspective, broken, etc., in space, not to a specific object in the real world.

Since the systems should enable soft and hard anchoring on the move (body and head movements) this movement is measured and compensated for by the IMU (inertial movement unit) device installed on the observation device.

It is one other principal object of the present invention to include the relative location, perspective and viewing angle of virtual objects in the portrayal of the real world, and the interaction between virtual objects with the real world and with other virtual objects.

It is a further principal object of the present invention to anchor virtual objects to the real world using see-through glasses.

Some Examples 3D image view and anchoring: If the viewer is watching a virtual sculpture while walking around it, he will see the sculpture from different angles accordingly to his viewing angle in relation to the sculpture.

Changing perspective on the move: If the viewer sees a virtual sign when driving his car on a road, the sign size will increase in size as a function of the viewer's distance from the sign when approaching the sign.

Physical characterization of the virtual object: If a tennis ball strongly hits a virtual glass of water, the glass will break and the water will be spilled because of the impact. But if a light paper ball will hit the same virtual glass of water, the glass of water will keep standing, despite the impact caused by the paper ball. That is to say the virtual glass and both types of ball contain online access to "Wikipedia-type" specific reference information within the solution (outcome of current events) concerning relative weights, sizes, impact angles and other relative physical data.

It is a still further principal object of the present invention to provide a head-mounted display comprising see-through glasses, a virtual retina display device or any other device or technology which allows a computer generated image (CGI) to be superimposed on a real-world view.

The head-mounted display (HMD) is worn on the head or as part of a helmet that has a small display optic in front of one eye (monocular HMD) or each eye (binocular HMD).

A typical HMD has either one or two small displays with lenses and semi-transparent mirrors embedded in a helmet, eye-glasses (also known as data glasses) or visor. The display units are miniaturized and may include cathode ray tube (CRT), liquid crystal display (LCD), Liquid crystal on silicon (LCoS), or Organic Light-Emitting Diode (OLED). In preferred embodiments multiple micro-displays are implemented to increase total resolution and field of view.

The device enables a computer generated image (CGI) to be superimposed on a real-world view. Combining a real-world view with a CGI is accomplished by projecting the CGI through a partially reflective mirror and viewing the real world directly. This method is often called Optical See-Through. Combining real-world view with CGI can also be done electronically by accepting video from a camera and mixing it electronically with CGI. This method is often called Video See-Through.

A virtual retinal display (VRD), also known as a retinal scan display (RSD) or retinal projector (RP), is a display technology that draws a raster display, typical of television, directly onto the retina of the user's eyes. The user sees what appears to be a conventional display floating in space in front of his eyes.

The present invention provides a computer generated image integrated on a real-world view, seen by the observer on the see through display glasses he is wearing at the time. The virtual objects will be seen by the observer, all around him, as those were real objects in the real world, displayed on the glasses he is wearing at the time, seen in his eyesight only.

It is one further principal object of the present invention to enable $3^{rd}$-party development of applications concerning the integration of a virtual world with the real world, and anywhere in the world. The method involves defining each virtual object, relevant to the specific application, and the nature of its interaction with the rest of the world It is yet a further principal object of the present invention to provide a software solution which involves data input deriving from dedicated hardware devices integrated on the glasses. The solution software utilizes the data input in order to anchor the virtual objects as seen through the glasses, to the real world, using different approaches.

It is yet one further principal object of a preferred embodiment of the present invention to anchor a virtual object to a specific point in space using the combination of the dual cameras installed on the display unit and an inertial movement unit (IMU) device integrated on the display unit as well.

An inertial measurement unit, or IMU, is an electronic device that measures and reports on a craft's velocity, orientation, and gravitational forces, using a combination of accelerometers and gyroscopes. IMU's are typically used to maneuver aircraft, including unmanned aerial vehicles (UAV's), among many others, and spacecraft, including shuttles, satellites and landers. Recent developments allow for the production of IMU enabled GPS devices. An IMU allows a GPS to work when GPS-signals are unavailable, such as in tunnels, inside buildings, or when electronic interference is present. A wireless IMU is known as a WIMU.

The IMU is the main component of inertial navigation systems used in air, space, water vehicles, and guided missiles among others. Thus, the data collected from the IMU's sensors allow computer-tracking of a vehicle's position, using dead reckoning. IMU detects the current rate of acceleration using accelerometers, and detects changes in rotational attributes like pitch, roll and yaw using one or more gyroscopes.

In order to stabilize a displayed image to a certain point in space, the source image size is reduced and projected into a full size floating black frame in which the source image floats. The floating aspect of the black frame may be defined as an aspect of a "floating black frame." The floating black frame containing the source image is transmitted to the glasses projector for display. The black color is seen as transparent in the glasses since black does not return light. Objects within a black screen are isolated and seen as they are. I.e., the observer does not see the floating black frame but only the source image.

The source image is inserted in the floating black frame as inverse movement to the head movement, according to the IMU data input, using a compensation calculation formula. In this way, the source image, as seen through the glasses, is steady at a certain point in space within the user's field of view. A virtual object is anchored to the real world, visually and functionally, using computer vision applications and a video camera integrated on the glasses.

The combination of the cameras and the IMU enable hard anchoring of the virtual and real objects, while the viewer can be on the move since the system can separate the viewer movements from the object movements.

Computer vision (CV) is a field that includes methods for acquiring, processing, analyzing and understanding images. In general, CV acquires multi-dimensional data from the real world in order to produce decision-based numerical or symbolic information. A recent CV development has been to duplicate the abilities of human vision by electronically perceiving and understanding an image. This image understanding can be seen as the disentangling of symbolic information from image data using models constructed with the aid of geometry, physics, statistics and learning theory.

As a scientific discipline, computer vision is concerned with the theory behind artificial systems that extract information from images. The image data can take many forms, such as video sequences, views from multiple cameras, or multi-dimensional data from a medical scanner. Sub-domains of computer vision include scene reconstruction, event detection, video tracking, object recognition, learning, indexing, motion estimation and image restoration. In most practical CV applications, the computers are pre-programmed to solve a particular task, but methods based on learning are now becoming increasingly common.

According to preferred embodiments of the present invention, CV is used to recognize structures and objects in the real world. Using a set of rules regarding the characteristics of each and every virtual object, and concerning its visual and functional behavior within the real world, including different view angles and perspective, markers are created in the real world and the virtual objects are anchored to them.

For example:

A virtual tea cup cannot float in the air and should be bound to a solid surface.

If the virtual tea cup sits on a real table, and somebody turns the real table around, the tea cup should turn around accordingly relative to the table, and should be seen as a 3D tea cup turning around from all perspectives.

Two actions need to be differentiated.

1. A user is looking at a particular field of vision. His head is naturally moving, smoothly. The virtual objects seen on the certain field of vision are steady, as if they were real objects. This is because they (the source CGI images) are displayed, and float, within a black frame.

2. The user is looking around. He sees a table. On the table there is a virtual cup of tea. This is because the algorithm recognizes that this specific cup of tea should be on that specific table and with the very same geo-position. When he looks around the algorithm recognizes, through computer vision, this particular table—as a marker—and displays this particular cup of tea—this CGI.

The present invention relies on 2D information, 3D static information and dynamic computer vision (CV). Anchoring a virtual object to the real world concerning 3D motion and perspective, visually and functionally, using binocular computer vision and two video cameras integrated on the glasses. In some ways CV is the inverse of computer graphics. While computer graphics produces image data from 3D models, CV often produces 3D models from image data.

In binocular CV two cameras are used together. Having two cameras confers a few advantages over having one. First, it gives a wider field of view. For example, humans have a maximum horizontal field of view of approximately 200 degrees with two eyes, approximately 120 degrees of which makes up the binocular field of view as seen by both eyes flanked by two uniocular fields (seen by only one eye) of approximately 40 degrees. Second, it gives binocular summation in which the ability to detect faint objects is enhanced. Third, it can give stereopsis, in which parallax provided by the different positions of the two cameras gives precise depth perception.

Implementing Optical Character Recognition (OCR) Applications

Optical character recognition (OCR) is the mechanical or electronic conversion of scanned images of handwritten, typewritten or printed text into machine-encoded text. It is widely used as a form of data entry from some sort of original paper data source, whether documents, sales receipts, mail or any number of other printed records. It is crucial to the computerization of printed texts so that they can be electronically searched, stored more compactly, displayed on-line and used in machine processes such as machine translation, text-to-speech and text mining. OCR is a field of research in pattern recognition, artificial intelligence and computer vision.

Implementing Gesture Control Applications

Gesture recognition is a topic in computer science and language technology with the goal of interpreting human gestures via mathematical algorithms. Gestures can originate from any bodily motion or state, but commonly originate from the face, hands and voice. Current focus in the field includes emotion recognition from the face and hand gesture recognition. Enhanced results have been achieved using cameras and CV algorithms to interpret sign language. However, the identification and recognition of posture, gait, proxemics, and human behavior are also subjects of gesture recognition techniques.

Gesture recognition can be seen as a way for computers to begin to understand human body language, thus building a richer bridge between machines and humans than primitive text user interfaces or even graphical user interfaces (GUI's), which still limit the majority of keyboard and mouse input.

Gesture recognition enables humans to interface with the machine (HMI) and interact naturally without any mechanical devices. Using the concept of gesture recognition, it is possible to point a finger at the computer screen so that the cursor will move accordingly. This could potentially make conventional input devices such as mouse, keyboard and even touch-screen redundant. Gesture recognition can be implemented with techniques from CV and image processing.

The present invention can be implemented using any smartphone as a computer, any other computer system or using cloud computing.

Cloud computing is the delivery of computing as a service rather than a product, whereby shared resources, software, and information are provided to computers and other devices as a utility, such as the electricity grid, over a network, typically the Internet. Cloud computing typically entrusts centralized services with data, software, and computation on a published application programming interface (API) over a network. It has a lot of overlap with software as a service (SaaS).

End users access cloud based applications through a web browser or a light weight desktop or mobile app while the business software and data are stored on servers at a remote location. Cloud application providers strive to give the same or better service and performance than if the software programs were installed locally on end-user computers. At the foundation of cloud computing is the broader concept of Converged Infrastructure (CI) and shared services. This type of data center environment allows enterprises to get their applications up and running faster, with easier manageability and less maintenance, and enables information technology (IT) to more rapidly adjust IT resources, such as servers, storage, and networking, to meet fluctuating and unpredictable business demand.

The present invention provides for implementing individual applications, implementing multi-user applications, and using wireless technologies and self-supply energy technologies The present invention provides a software development kit (SDK). The SDK includes a data base containing specific definitions for each and every virtual object concerning the nature of its visual, functional and behavioral characteristics, including its interaction characteristics with the rest of the world, virtual and real. The SDK includes a set of logic rules concerning features of any kind relevant to the development of applications which integrate a virtual world with a real world.

Information sharing is defined between individuals to create a common virtual world integrated with the real world. For example:

Imagine a tennis match viewed from the side. The observer looks to his left and sees player A hitting the ball. Then he looks to his right and sees player B hitting the ball. Player B's reaction was caused by player A's action, and so on. The interaction between the two players concerns ball speed and direction as caused by each of them in turn, as affected by his opponent's previous action. The tennis match is a sequence of interactions between the two players.

If the two players were operated by two different computers, the interaction between them would be a result of the interaction between the two applications as implemented by the two different computers. The tennis match would be then a sequence of interactions between two independent applications.

In the particular example of a tennis match, the ball should be displayed in both applications reflecting the sequence of actions and reactions, concerning speed and direction, calculated in each application as a result of the previous action, and creating a mutual logic between the two independent applications. In terms of virtual intelligence, this mutual logic represents the "intelligence of the ball."

According to preferred embodiments of the present invention this is an essential requirement in order to implement mobile augmented reality. The "intelligence of the ball" logic enables mobile augmented reality as a personal solution for each user, as well as a common solution for all users, allowing many to implement a common experience, each one from his unique point of view and by his unique sequence of interactions with the general experience, and with each of the others, separately.

The present invention enables a dedicated micro processor to activate and implement applications, including IMU anchoring, computer vision anchoring, external computer system emulation, application interfacing, OCR applications, gesture control applications and other applications relevant to the invention.

All the above and other characteristics and advantages of the invention will be further understood through the following illustrative and non-limitative description of preferred embodiments thereof.

BRIEF DESCRIPTION OF THE DRAWINGS

In order to understand the invention and to see how it may be carried out in practice, a preferred embodiment will now be described, by way of a non-limiting example only, with reference to the accompanying drawings, in which.

DETAILED DESCRIPTION OF PREFERRED EMBODIMENTS

The principles and operation of a method and an apparatus according to the present invention may be better understood with reference to the drawings and the accompanying description, it being understood that these drawings are given for illustrative purposes only and are not meant to be limiting.

Figure 1:
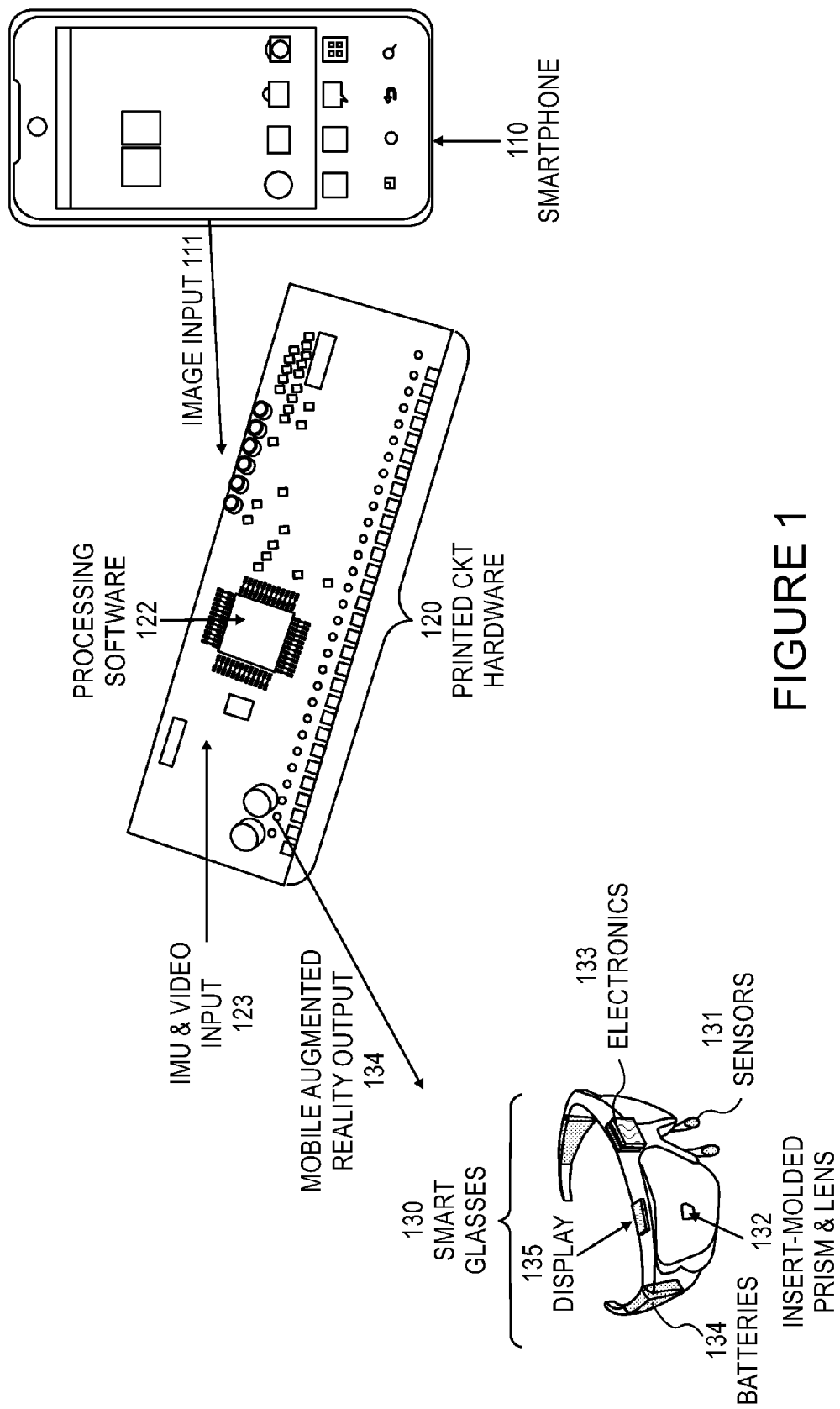
FIG. 1 is a schematic illustration for a system to anchor virtual objects to the real world, constructed according to the principles of the present invention.

FIG. 1 is a schematic illustration for a system to anchor virtual objects to the real world, constructed according to the principles of the present invention. An exemplary embodiment includes a user's smartphone 110, printed circuit hardware 120 and smart glasses 130 worn by the user. Smartphone 110 provides an image input 111 to printed circuit hardware 120, which includes processing software 122 and orientation data coming from an inertial movement unit (IMU) on smart glasses 130 along with computer vision video input 123 coming from one or two (2D and 3D) micro cameras integrated on smart glasses 130.

Mobile augmented reality output 124 is returned from printed circuit hardware 120 back to smart glasses 130. Smart glasses 130 include 3D orientation sensors 131 (for IMU input data), insert-molded prism and lens 132, electronics 133, batteries 134 and a display 135.

Figure 2:
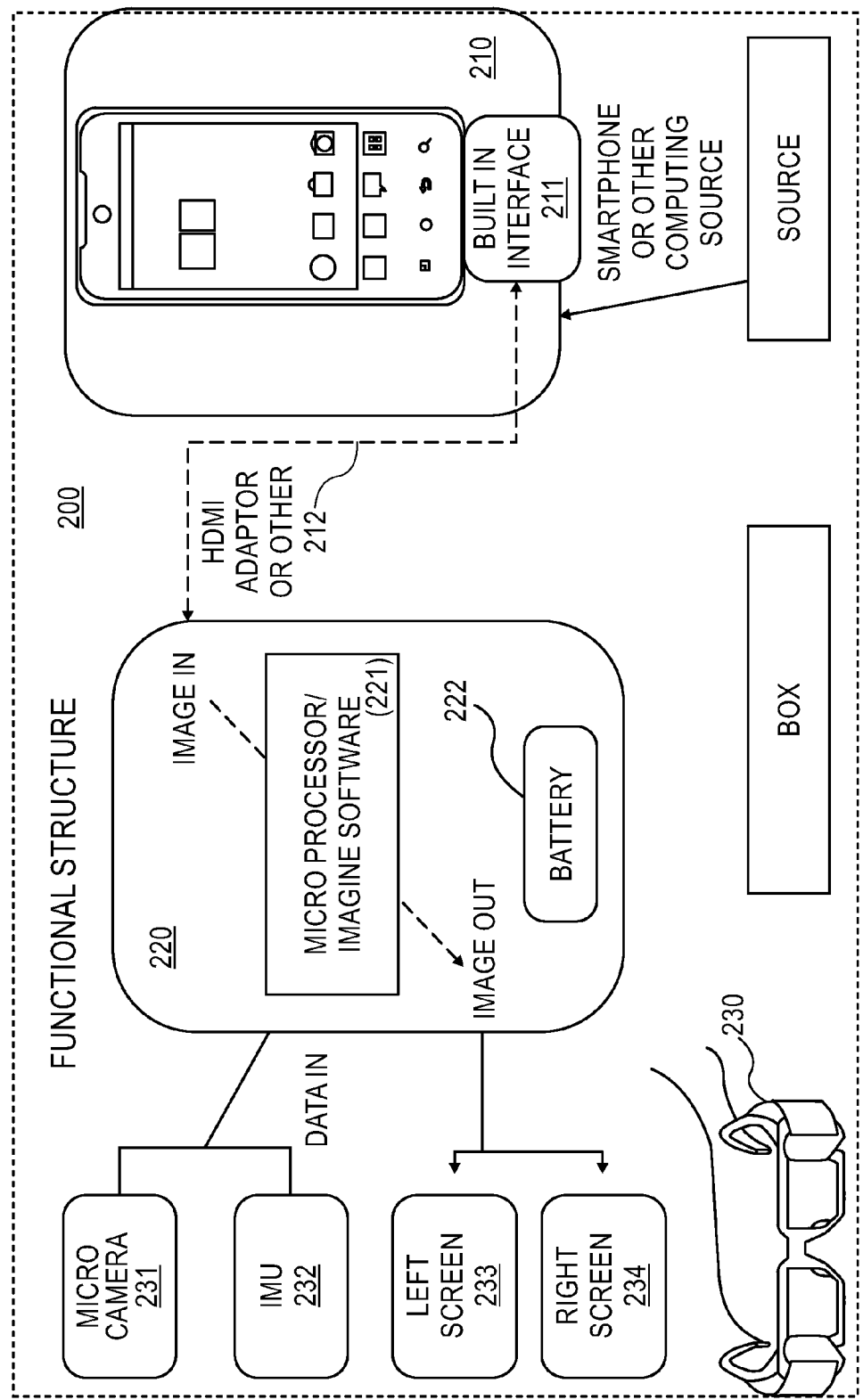
FIG. 2 is a functional structure diagram for a system to anchor virtual objects to the real world, constructed according to the principles of the present invention.

FIG. 2 is a functional structure diagram 200 for a system to anchor virtual objects to the real world, constructed according to the principles of the present invention. High-Definition Multimedia Interface (HDMI) 212 is a compact audio/video adapter for transferring encrypted uncompressed digital audio/video data from an HDMI-compliant device ("the source" or "input" smartphone digital audio device, computer monitor or video projector "box" 220. Smartphone source 210 includes a built-in interface 211, which receives data from HDMI adapter 212 and returns images to microprocessor 221. A pair of smart glasses 230, worn by a user, houses a microcamera 231 and an IMU 232, both of which provide data input to a microprocessor/software unit 221 in box 220, which also houses a battery 222, in an exemplary embodiment. Smart glasses 230 include also a left screen 233 and a right screen 233, which receive display images output from microprocessor 221 to be viewed by the user.

Figure 3:
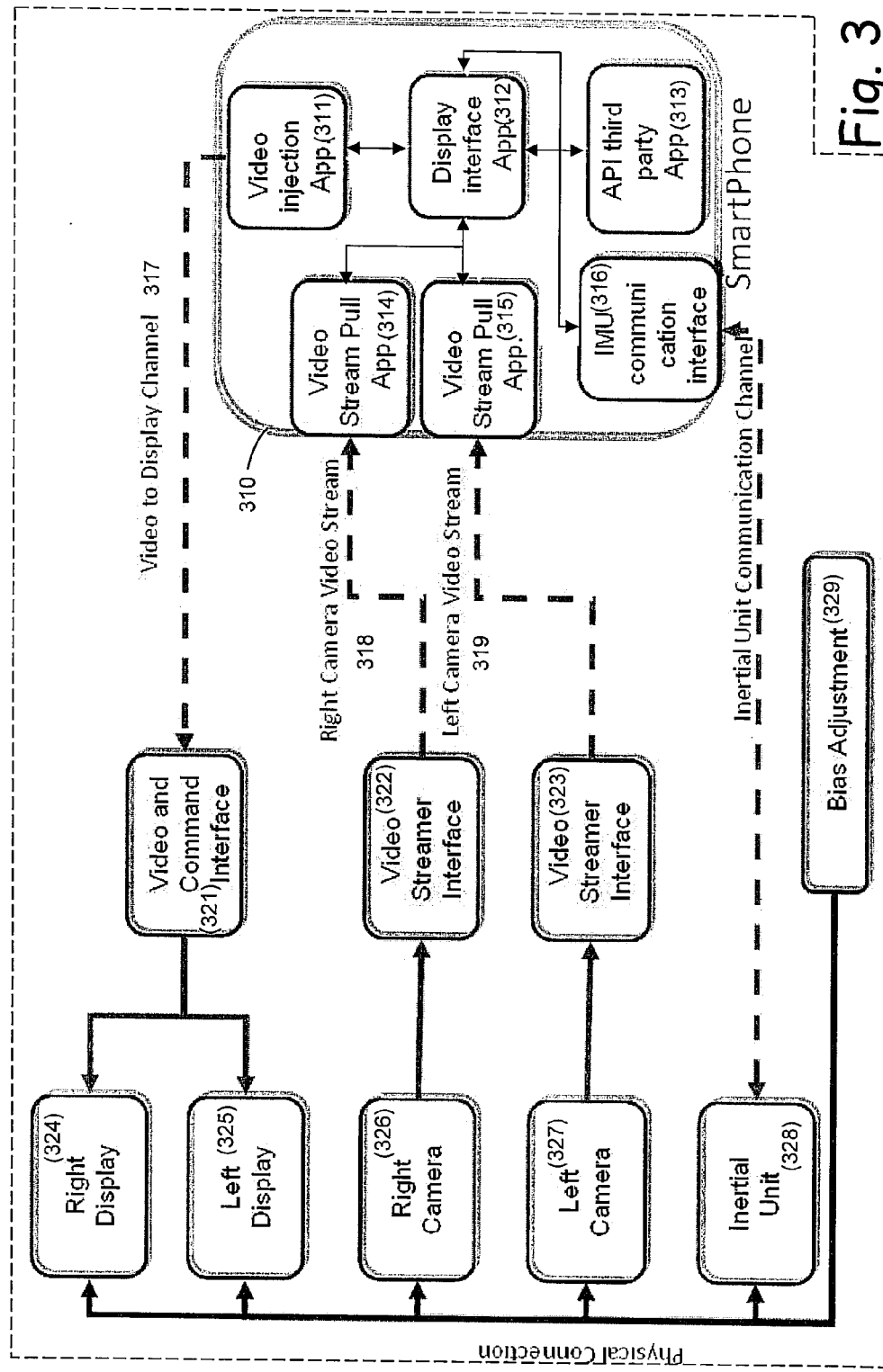
FIG. 3 is a general block diagram for a system to anchor virtual objects to the real world, constructed according to the principles of the present invention.

FIG. 3 is a general block diagram 300 for a system to anchor virtual objects to the real world, constructed according to the principles of the present invention. Connections are shown between a smartphone 310 (or other computing source in other embodiments) and the glasses. Smartphone 310 modules include a video injection application 311, a display interface application 312, an Application Programming Interface (API) $3^{rd}$ party application 313, a rightside video stream pull application 314, a leftside video stream pull application 315 and an inertial measurement unit (IMU) communication interface 316.

Interfaces between smartphone 310 and the glasses include a video interface display command interface 321, a rightside video streamer interface 322 and a leftside video streamer interface 323. Glasses modules include a rightside display 324, a leftside display 325, a rightside camera 326, a leftside camera 327 and an IMU 328. The glasses also have a bias adjustment 329.

Video and command interface 321 receives video from video injection application 311 via a video display channel 317, rightside video streamer interface 322 transmits a rightside camera video stream 318 to rightside video stream pull application 314 and a leftside video streamer interface 323 transmits a leftside camera video stream 319 to leftside video stream pull application 315.

Figure 4:
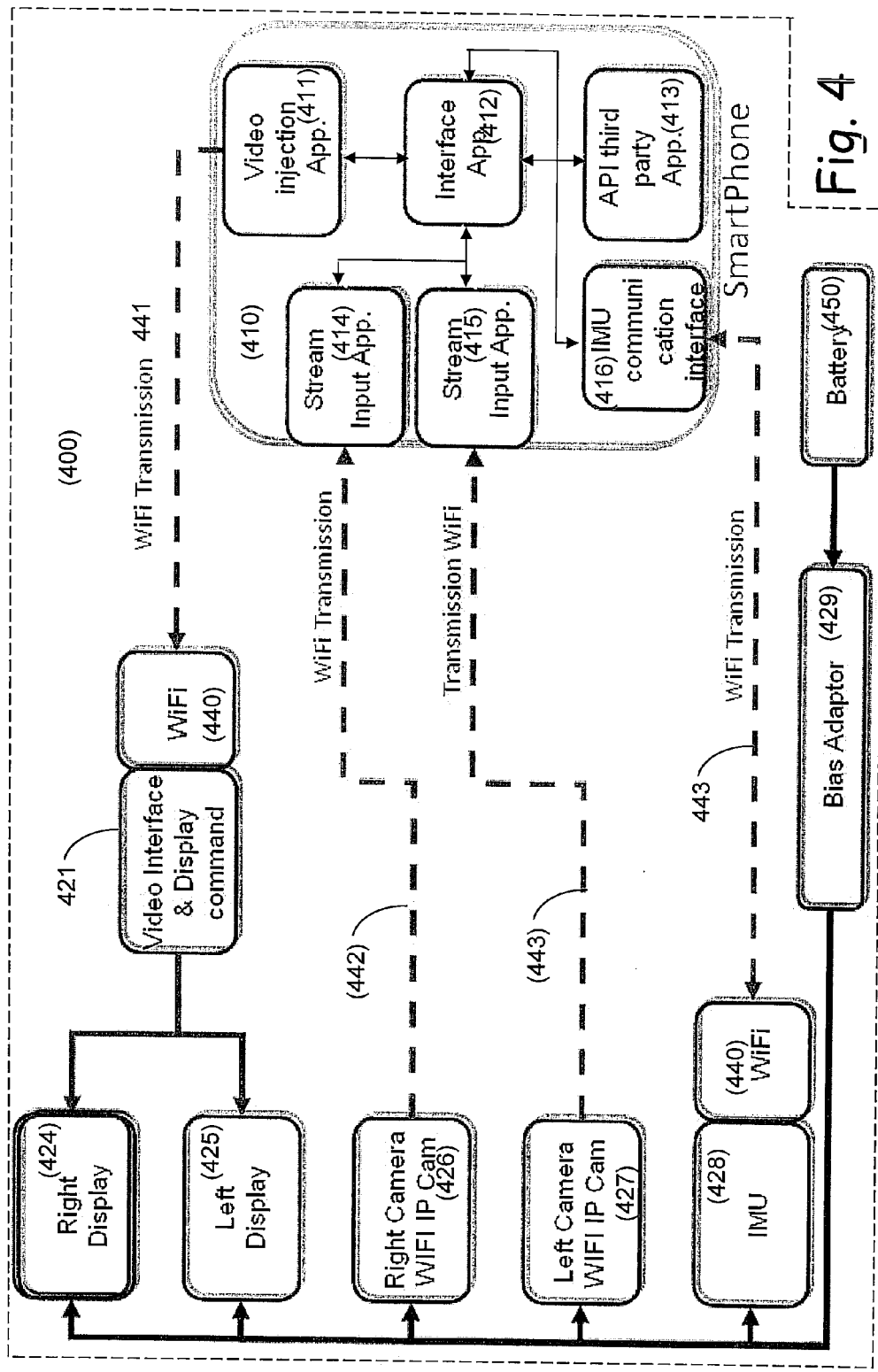
FIG. 4 is a wireless connection block diagram for a system to anchor virtual objects to the real world, constructed according to the principles of the present invention.

FIG. 4 is a wireless connection block diagram 400 for a system to anchor virtual objects to the real world, constructed according to the principles of the present invention. Wireless connections are shown between a smartphone 410 (or other computing source) and the glasses. Smartphone 410 modules include a video injection application 411, a display interface application 412, an Application Programming Interface (API) $3^{rd}$ party application 413, a rightside stream input application 414, a leftside stream input application 415 and an inertial measurement unit (IMU) communication interface 416.

Video interface and display command 421 receives video from video injection application 411 via WiFi display transmission 441. Glasses modules include a rightside display 424, a leftside display 425, a rightside WiFi IP camera 426, a leftside WiFi IP camera 427 and an IMU 428 with WiFi buffer 440 and passes information to rightside display 424 and leftside display 425. The glasses also have a bias adjustment 429 powered by a battery 450.

Rightside camera WiFi IP 426 transmits rightside WiFi 442 to rightside stream input application 414 and leftside camera WiFi IP 427 transmits leftside WiFi 443 to leftside stream input application 415.

Having described the present invention with regard to certain specific embodiments thereof, it is to be understood that the description is not meant as a limitation, since further modifications will now suggest themselves to those skilled in the art, and it is intended to cover such modifications as fall within the scope of the appended claims.

We claim:

1. A method providing for the positioning of virtual objects viewed by a user in a field of view as virtual images among real objects, according to a system for anchoring a position and movement of virtual objects viewed in the field of view as virtual images among real objects in the real world as seen by the user, the system comprising:
 a see-through projection device worn on the head of the user, comprising an inertial measurement unit (IMU) comprising:
  3 axis gyros; and
  3 axial accelerometers;
 a computer worn by the user to generate the virtual images; and
 at least one embedded camera,
 wherein the virtual objects are computer generated (source) images (CGI's) configured to be super-imposable on the real-world objects in the field of view, and wherein the virtual objects are anchored to the real world objects, consistent both with relative movements of the objects and relative movements of the user, and wherein during such relative movements the virtual objects will change at least in magnification, orientation and shading, as if they were real objects, and wherein anchoring of the virtual objects to a specific azimuth in coordinate space is provided by the IMU, by moving the computer generated (source) image (CGI) within a floating black frame which does not reflect light and is seen as transparent, using a compensation formula (soft anchoring), the method comprising:
 moving of his head by the user, and therefore moving of the system;
 reading, according to software algorithms stored on the computer, of the IMU gyros and accelerometers for determining the amount, direction and rate of relative movements;
 videoing by the camera;
 projecting the source CGI's into the field of view; and
 translating the source CGI's by one of the following:
  stabilizing the source CGI images for said movements or vibrations;
  changing the orientation of the virtual object for said movements; and
  removing of the virtual object upon leaving the field of view, thereby anchoring the position of the virtual objects,
 wherein stabilizing fixes the source CGI at a defined point in space, as seen through the see-through projection device, the stabilizing step further comprising:
 reducing the size of the source CGI;
  wherein said projecting the source CGI into a full size floating black frame in which the source CGI floats does not require image processing of the entire field of view for viewing the source CGI's.

2. A method for anchoring, according to the system of claim 1, the method comprising providing for soft anchoring of the position of virtual objects viewed as virtual images among real objects, wherein the device is stabilized and static, and wherein the virtual object is seen as stationary.

3. The method of claim 1, further comprising constant moving of the source CGI as a result of output by analysis and processing the software algorithms.

4. The method of claim 3, wherein the constant movement is opposite to the inertial movement received from the IMU, and wherein a default compensation calculation formula is derived by measuring the angular variation by the IMU and/or by the cameras, such that the source (CGI) movements are exactly the opposite of the inertial movement data, as received from the IMU.

5. The method of claim 4, further comprising manipulating the formula in order to fit the source CGI positioning to different circumstances and scenarios.

6. The method of claim 5, further comprising transmitting the black frame containing the source image to the see-through projection device for display.

7. The method of claim 6, wherein the black color is seen as transparent such that the source image is isolated and seen as if was the only image.

8. The method of claim 1, wherein the see-through projection device is see-through glasses.

9. The system of claim 8, wherein the computer is integrated with the glasses.

10. The method of claim 1, wherein the see-through projection device is a see-through head-mounted display.

11. The method of claim 1, wherein the computer worn on the head by the user is a smart-phone.

12. The method of claim 1, further comprising defining and adjusting the movements or vibrations.

13. The method of claim 1, further comprising: analyzing the real world image, as seen by the cameras and inputted to the processing software, using computer vision; and creating by the algorithm positioning markers on the real objects in order to anchor the virtual object in three dimensions.

14. The method of claim 1, wherein the display device is equipped with IMU, a camera and a microphone, the method further comprising: controlling gestures of the virtual objects done by the user through at least one of: hands; head; and voice.

15. The method of claim 1, wherein the software integrates virtual objects to the real world, functionally and behaviorally, wherein the software comprises at least: a dynamic data base providing a definition for each virtual object concerning its nature of interaction, function and behavior with the rest of the world, virtual and real; and a table of real objects.

16. The method of claim 1, wherein the processing software relates the virtual objects displayed as the real objects are seen through the cameras mounted on the glasses, functional and behavioral, according to relevant definitions of nature of interaction as defined in the data base, and according to a set of logic rules.

17. The method of claim 1, further comprising sharing a common virtual world between individuals, enabled by a software application that allows individuals to share information regarding virtual objects including anchoring and integration to the real world, visually, functionally and behaviorally, and concerning the view angle and perspective of each individual respectively to the virtual and real world.

18. The method of claim 1, further comprising sharing information regarding the interaction of a plurality of users involved in a certain application or situation with the virtual world, and creating a sequence of events concerning the interaction of the common virtual world with the real world, in which each event influence the sequence.

19. The system of claim 1, further comprising a software development kit (SDK) which allows the elaboration and modification of the data base and the logic rules contained in the solution's software, thereby enabling the creation of applications of any kind concerning anchoring and integrating a virtual world to the real world using see through glasses or other head-mounted display (HMD).

* * * * *